United States Patent
Hoff et al.

(10) Patent No.: US 7,324,556 B2
(45) Date of Patent: Jan. 29, 2008

(54) METHODS AND MEANS RELATED TO THE MAINTENANCE OF CONNECTIONS IN A GPRS NETWORK

(75) Inventors: Per Magne Hoff, His (NO); Heine Mo, Oslo (NO); Jonas Martin Perleryd, Malmö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 705 days.

(21) Appl. No.: 10/451,827

(22) PCT Filed: Dec. 28, 2001

(86) PCT No.: PCT/NO01/00514

§ 371 (c)(1),
(2), (4) Date: Jun. 25, 2003

(87) PCT Pub. No.: WO02/054794

PCT Pub. Date: Jul. 11, 2002

(65) Prior Publication Data

US 2004/0053623 A1    Mar. 18, 2004

(30) Foreign Application Priority Data

Dec. 29, 2000    (NO) ................................. 20006720

(51) Int. Cl.
*H04J 3/16* (2006.01)
*H04J 3/22* (2006.01)

(52) U.S. Cl. ........... 370/469; 455/423; 455/452.1; 455/466; 455/560; 370/328; 370/329; 370/352; 370/394

(58) Field of Classification Search ............... 455/466, 455/452.1, 423, 560; 370/329, 328, 394, 370/352, 469
See application file for complete search history.

(56) References Cited

U.S. PATENT DOCUMENTS

| | | | |
|---|---|---|---|
| 5,745,695 A | | 4/1998 | Gilchrist et al. |
| 6,104,929 A | | 8/2000 | Josse et al. |
| 6,370,390 B1 | * | 4/2002 | Salin et al. ............. 455/466 |
| 6,456,858 B1 | * | 9/2002 | Streter ................. 455/552.1 |
| 6,615,269 B1 | * | 9/2003 | Suumaki et al. ........... 709/230 |

FOREIGN PATENT DOCUMENTS

EP    0 859 531 A2    1/1998
WO    WO 01/45347 A2    6/2001

OTHER PUBLICATIONS

Harry Newton, "Newton's Telecom Dicitonary," Oct. 1998, Telecom Books, 14th Edition, p. 432.*

* cited by examiner

Primary Examiner—Rafael Perez-Gutierrez
Assistant Examiner—My X Nguyen

(57) ABSTRACT

This new invention is a method of re-establishing MS-SGSN connections after a partial restart of SGSN, i.e., only the Gb-interface is restarted. The re-establishment is achieved without detaching the MS. With this method Ciphering is re-synchronised, PDP-contexts in unacknowledged mode are re-established, and SMS traffic over GPRS is re-established, while PDP-contexts in acknowledged mode are deactivated with order to re-activate. When the MS is moving within the coverage of a SGSN, the invention can be used to move the context closer to the used Gb-link. When the MS request better Quality of Service, the MS context can moved to more suitable SGSN resource with this invention.

18 Claims, 5 Drawing Sheets

METHODS AND MEANS RELATED TO THE MAINTENANCE OF CONNECTIONS IN A GPRS NETWORK

TECHNICAL FIELD

The invention relates to controlling of the SGSN's of a GPRS network and in particular a method for partial restart of Gb-interfaces. (For an explanation of the terminology used, reference is made to the chapter "Abbreviation and Terminology").

TECHNICAL BACKGROUND

Some of the protocol layers at the Gb-interface in SGSN contain traffic dependent information, e.g. received/sent sequence numbers. The traffic dependent protocol layers in question are LLC, described in GSM 04.64: "Digital cellular telecommunications system (Phase 2+); General Packet Radio Service (GPRS); Mobile Station—Serving GPRS Support Node (MS-SGSN) Logical Link Control (LLC) layer specification", version 6.7.0 Release 1997, February 2000, SNDCP described in GSM 04.65: "Digital cellular telecommunications system (Phase 2+);

General Packet Radio Service (GPRS); Mobile Station (MS)—Serving GPRS Support Node (SGSN); Subnetwork Dependent Convergence Protocol (SNDCP)", version 6.7.0 Release 1997, February 2000, and GMM, described in GSM 04.08: "Digital cellular telecommunications system (Phase 2+);

Mobile radio interface layer 3 specification", version 6.10.0 (6.a.0) Release 1997, April 2000. The lower most protocol layers at the Gb-interface (BSSGP, NS and L1bis) are stateless, i.e., no MS-related information which changes value during a session are stored in these layers.

If a CPU/processor board with volatile memory serving one or both of LLC/SNDCP protocol layers is restarted, the traffic dependent information is lost in SGSN. Volatile memory is typically dynamic RAM.

According to the GPRS standards, the MS'es which are served by a restarted Gb-interface shall be thrown out of the SGSN-node, as stated in GSM 04.08, Section 13.6.2: "When an SGSN fails, it deletes all MM and PDP contexts affected by the failure".

The SGSN will not notify the MS about the failure. When the MS eventually has something to send, it will detect that it has been thrown out of the SGSN, and thus must perform a new GPRS attach and PDP context activation.

When SGSN sends and receives LLC and SNDCP PDU'es, the following must be stored; state variables, sequence numbers and frame dependent input to ciphering function. LLC and SNDCP PDU are sent/received at a high rate (throughput). After a processor board failure, several techniques exist to re-establish the communication between MS and SGSN:

Using a hard disk,
i.e., storing traffic dependent information on disk. However, this type of memory has a high latency, and thus will lower the throughput (packets per second), i.e. not very feasible.
Using static RAM.
I.e., storing traffic dependent information in static RAM (instead of dynamic RAM). Static RAM is more expensive than Dynamic RAM, and thus increases the production cost of a SGSN.
Throw out the affected MS'es from the SGSN, and let them do new GPRS attach, as described in [4] GSM 03.60: "Digital cellular telecommunications system (Phase 2+);
General Packet Radio Service (GPRS); Service Description; Stage 2", version 6.7.0 Release 1997, March 2000, Section 13.6.2. This will be perceived as annoying for the subscriber using the Mobile. Mobiles which do not send anything and are within the same Routing Area, will use up to 54 minutes (default periodic routing area update timer interval), ref. GSM 04.08, Section 4.7.5.1 and Table 11.3a, before GMM in the MS detects it has been thrown out. For example, MS terminating SMS-traffic over GPRS might not have been deliverable for 54 minutes. Another example is push services, such as reports from stock-marked which will not be deliverable for thrown out subscribers.

SUMMARY OF THE INVENTION

The present invention relates to a method for re-establishing the LLC-links after a partial restart of the Gb-interface that avoids the drawbacks mentioned above.

An object of the inventive method is to keep the MS attached after a failure of a CPU/processor board in a SGSN.

This is achieved by first performing a preparatory step, in which the GMM, LLC and SNDCP layers locally in SGSN are prepared. The SGSN will not inform the MS about the restart event. In the next step, the MS sends, or is brought to send, an LLC frame to the SGSN. The LLC frame will supply the missing information (cell position of the MS) to the SGSN, and the re-establishment of the LLC-links is performed.

However, the exact scope of the inventive solution will appear from the appended patent claims.

BRIEF DESCRIPTION OF THE DRAWINGS

FIG. 1 shows the protocol stack used for payload (e.g., IP-packets) and FIG. 2 shows the protocol stack involved when MS and SGSN wants to do signalling, including Short Message Service (SMS).

DETAILED DESCRIPTION OF THE INVENTION

LLC layer has a reset mechanism that is used in this invention in a new context when the Gb-interface is restarted. The LLC reset mechanism is standardized to be used when the MS enters a new SGSN without doing a new GPRS attach, (i.e., Inter SGSN Routing Area Procedure, as described in GSM 03.60, Section 6.9.1.2.1 & 6.9.1.3.2).

When a restart of Gb-interface in SGSN occurs, the LLC and SNDCP layers locally in SGSN are prepared, i.e., the affected MS-contexts activates a reset flag, GMM is set in mobile-reachable state, mobile-reachable timer is started, LCC layer is set in suspend state with page=true and ciphering key is set. SNDCP layer in SGSN gets its activated PDP-contexts. In the next step, the MS sends, or is brought to send, an LLC frame to the SGSN. The LLC frame will supply the missing information (the cell location of the MS) to the SGSN, and all layers will be re-established (the LLC reset mechanism). Note that the MS is connected to the same SGSN as before restart. GMM signalling, SMS traffic and PDP-context in unacknowledged mode is re-established. SGSN orders the MS to deactivate and reactivate PDP-contexts in acknowledged mode.

Figure 3:
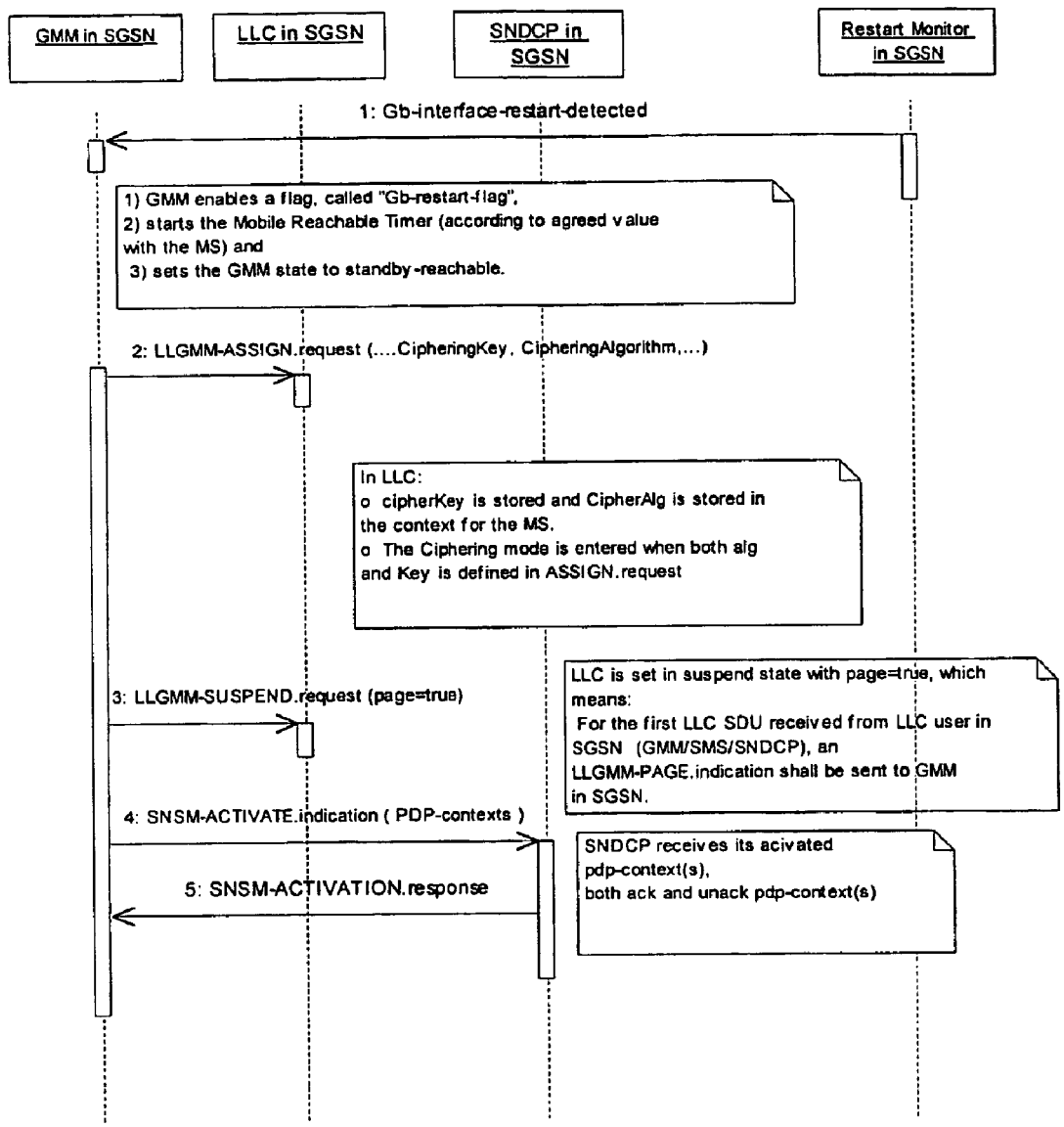
FIG. 3 is a sequence diagram showing the steps of one of the sequences constituting the invention; Sequence: Gb-interface restarted, GMM re-initiates LLC and SNDCP.

The details are shown in FIGS. 3, 4, 5 and 6 below. Several possible combinations of sequence executions exist:

Combination 1:
FIG. 3: "Gb-interface restarted, GMM re-initiates LLC and SNDCP" (always first), then
FIG. 4: "Uplink traffic after restart of Gb-interface".

Combination 2:
FIG. 3: "Gb-interface restarted, GMM re-initiates LLC and SNDCP", then
FIG. 5: "Downlink unacknowledged traffic after restart of Gb-interface, then
FIG. 4: "Uplink traffic after restart of Gb-interface".

Combination 3:
FIG. 3: "Gb-interface restarted, GMM re-initiates LLC and SNDCP", then
FIG. 6: "Downlink acknowledged traffic after restart of Gb-interface", then
FIG. 4: "Uplink traffic after restart of Gb-interface"

These three embodiments of the invention all include a preparatory step (FIG. 3) in which the SGSN performs a preparation without the MS being informed. The connection between the MS and SGSN is ultimately re-established by the MS sending an LLC-frame towards the SGSN (FIG. 4), upon which the traffic is resumed without the MS being aware of the fact that the connection has been broken. However, there can be different reasons for the MS to send the LLC-frame. One reason can simply be that the user of the terminal wants to send uplink data. Alternatively, a message/packet intended for the MS is detected by the SGSN. In order to get the current position to the MS, the MS is paged. The MS must then reply to a paging with an LLC-frame (which will indicate the position. In the following text, the individual sequences will be described in detail in reference to the corresponding FIGS. 3-6.

FIG. 3: GB-Interface Restarted, GMM RE-Initeates LLC and SNDCP

A Monitor Function in SGSN detects that a CPU handling LLC or/and SNDCP layers has restarted. Affected GMM in SGSN is informed about the event and will take action to re-initiate the LLC and SNDCP layers. The re-initialisation procedure is shown in FIG. 3. The procedure is executed per affected MS. Each step is explained in the following list.

Figure 4:
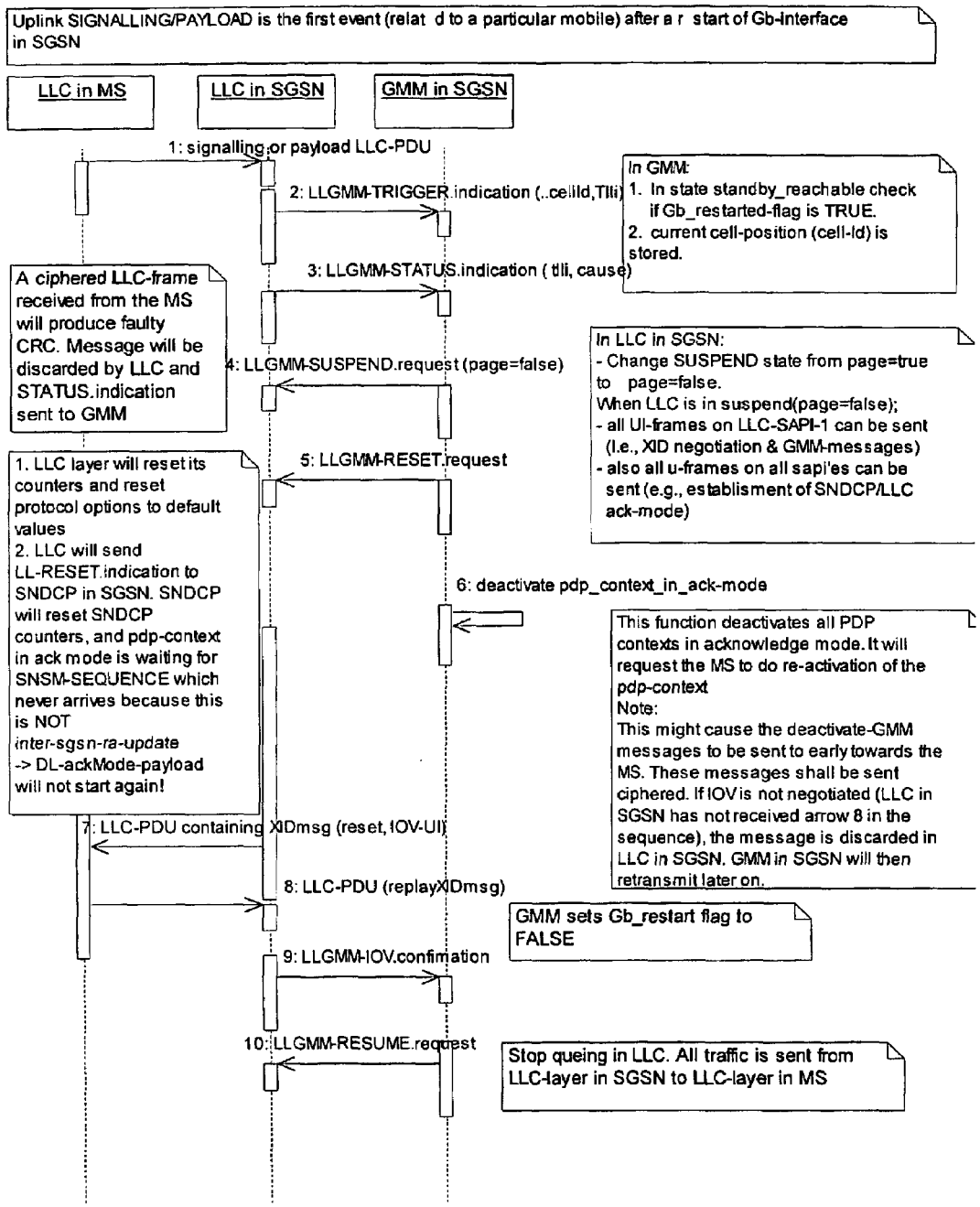
FIG. 4 is a sequence diagram showing the steps of Sequence: Uplink traffic after restart of Gb-interface.

1) GMM layer in SGSN is informed about restart of the local Gb-interface. Affected MS contexts are found. For each MS context; a) GMM enables a flag, called "Gb-restart-flag", a) starts the Mobile Reachable Timer (according to agreed value with the MS) and c) sets the GMM state to standby-reachable.
2) GMM initiates the LLC layer with the service primitive LLGMM-ASSIGN.request. Ciphering key and ciphering algorithm is sent (if known before restart) as service primitive parameters.
3) GMM cannot trust any known (before restart) cell position of the MS. Therefore, LLGMM-SUSPEND.request is sent to LLC with service primitive parameter page=true. LLC layer will inform GMM if any LLC users (GMM, SMS or SNDCP) in SGSN want to send something to the MS, and GMM will Page the MS.
4) GMM re-enters any established PDP contexts (before restart) to the SNDCP layer. This is important since downlink payload might be the first event to happen (Combination 2 or 3). Both PDP context in acknowledged and unacknowledged mode are (if existing before restart) re-entered. This is performed through the SNSM-ACTIVATE.indication service primitive.
5) SNDCP confirms the re-entering of PDP-contexts with SNSM-ACTIVATION.response FIG. 4: Uplink Traffic After Restart of GB-Interface FIG. 3 has been executed; i.e., GMM, LLC and SNDCP layers are ready to handle traffic for a particular MS. In FIG. 4, the first event after a Gb-restart is traffic sent from the MS (which has not detected that the Gb-interface has been restarted). Each step in FIG. 4 is explained in the following list.

1) The MS sends a LLC frame containing either signalling traffic, SMS or payload.
2) LLC informs GMM about the event "something is received from the MS and his position is Cell-Id" with the service primitive LLGMM-TRIGGER.indication. GMM will store the cell-position and enter GMM state READY.
3) If the MS has ciphered the LLC-frame, the LLC layer in SGSN will not be able to reproduce the plain text, i.e., the Check Sum (CRC) is faulty. The received frame is discarded and LLGMM-STATUS.indication is sent to GMM about the event.
4) Since GMM knows the position of the MS, LLC layer is set into another suspend state with the service primitive LLGMM-SUSPEND.request (page=false).
5) GMM in SGSN orders LLC layer to inform the MS about need of re-initialisation of the LLC and SNDCP layer. This is done with the service primitive LLGMM-RESET.request.
6) GMM in SGSN will start to deactivate PDP-context in acknowledged mode. SGSN orders GGSN to deactivate the PDP-context. When GGSN responds, deactivated message is sent towards the MS with request of reactivation.
7) Since LLC layer has received LLGMM-RESET.request, the LLC layer will calculate a new random value of the IOV-UI and sends the LLC-XID message with parameters reset & IOV-UI to the MS. SNDCP layer in SGSN will receive service primitive LL-RESET.indication. SNDCP will reset all sequence counters and compression parameters will be set to default values. i.e., any compression is ended.
8) The MS responds to the XID-message with a new XID-message
9) When LLC layer in SGSN receives this XID response, GMM is informed about the event with service primitive LLGMM-IOV.confirmation and/or LLGMM-RESET.confirmation. GMM sets the Gb-restart flag to false.
10) GMM sends LLGMM-RESUME.request, i.e., LLC-layer is told to start to transmit any buffered messages towards the MS.

Will the MS accept the XID message in FIG. 4, arrow 7 "LLC-PDU containing XID msg. (reset, IOV-UI)"? The Reset part will be accepted, but the IOV-UI part might be rejected.

According to GSM 04.64, Section 8.5.3.1, the MS shall only accept the new IOV-UI only before "enabling of ciphering". What is the definition of "enabling of ciphering"? According to [1], the MS enables the ciphering when the Kc and Cipher Algorithm is set in LLGMM-assign.request received from its local GMM.

According to GSM 03.60, Section 6.8.1; "In the routing area update case, if ciphering was used before the routing area update, and if the Authentication procedure is omitted, then the SGSN shall resume ciphering with the same algorithm when a ciphered Routing Area Update Accept message is sent, and the MS shall resume ciphering when a ciphered Routing Area Update Accept message is received". The term "resume ciphering" is interpreted to be the same as GMM sending a LL-UNITDATA.request with cipher-bit set to true. In order to receive a ciphered Routing Area Update Accept message, the Kc and Cipher Algorithm must be set by the MS. In other words, the MS has "enabled the ciphering" during the whole RA update sequence.

Is IOV-UI re-negotiated during Inter-SGSN RA update? Yes, quote from GSM 04.64, Section 7.2.1.2, "LLGMM-RESET-REQ shall be used to order LLC in the SGSN to perform an XID negotiation of Reset and IOV-UI. The LLC layer shall randomly select the value of IOV-UI."

Conclusion: It is most likely that the MS will accept the re-negotiation of IOV-UI after enabling the ciphering.

Why reactivate PDP-context in acknowledged mode activated?

In FIG. 4, arrow 6, the GMM in SGSN initiates deactivation of PDP-context in acknowledged mode with request of re-activation, why?

The LLC reset mechanism (FIG. 3, arrow 7) is standardized to be used when the MS enters a new SGSN without doing a new GPRS attach, (i.e., Inter SGSN Routing Area Procedure, GSM 03.60, Section 6.9.1.2.1 & 6.9.1.3.2). When an MS changes SGSN, the new-SGSN does not have the required state information to overtake where the old SGSN lost communication to the MS. Therefore, it is required to reset the LLC-links between new-SGSN and the MS. The LLC-XID-reset message is used for this. According to GSM 04.64 Section 8.5.3.1 and GSM 04.65, Section 5.1.2.1, unacknowledged LLC-links are reset, ciphering is re-synchronised, and unacknowledged PDP-contexts are reset. PDP-contexts in acknowledged mode is halted until received-SNDCP-PDU-numbers are interchanged between the SNDCP-peers (via GMM), i.e., this question must be resolved, "how many SNDCP PDUs are received successfully by remote end before changing SGSN?" After interchanging received-PDU-numbers, the MS and SGSN know where to continue.

In this invention, the GMM in the MS has NOT detected change of SGSN and this interchange of received-SNDCP-PDU-numbers will not take place. In order to get out of this deadlock, SGSN must order the MS to deactivate the PDP-context in acknowledged mode with request of re-activate.

Figure 5:
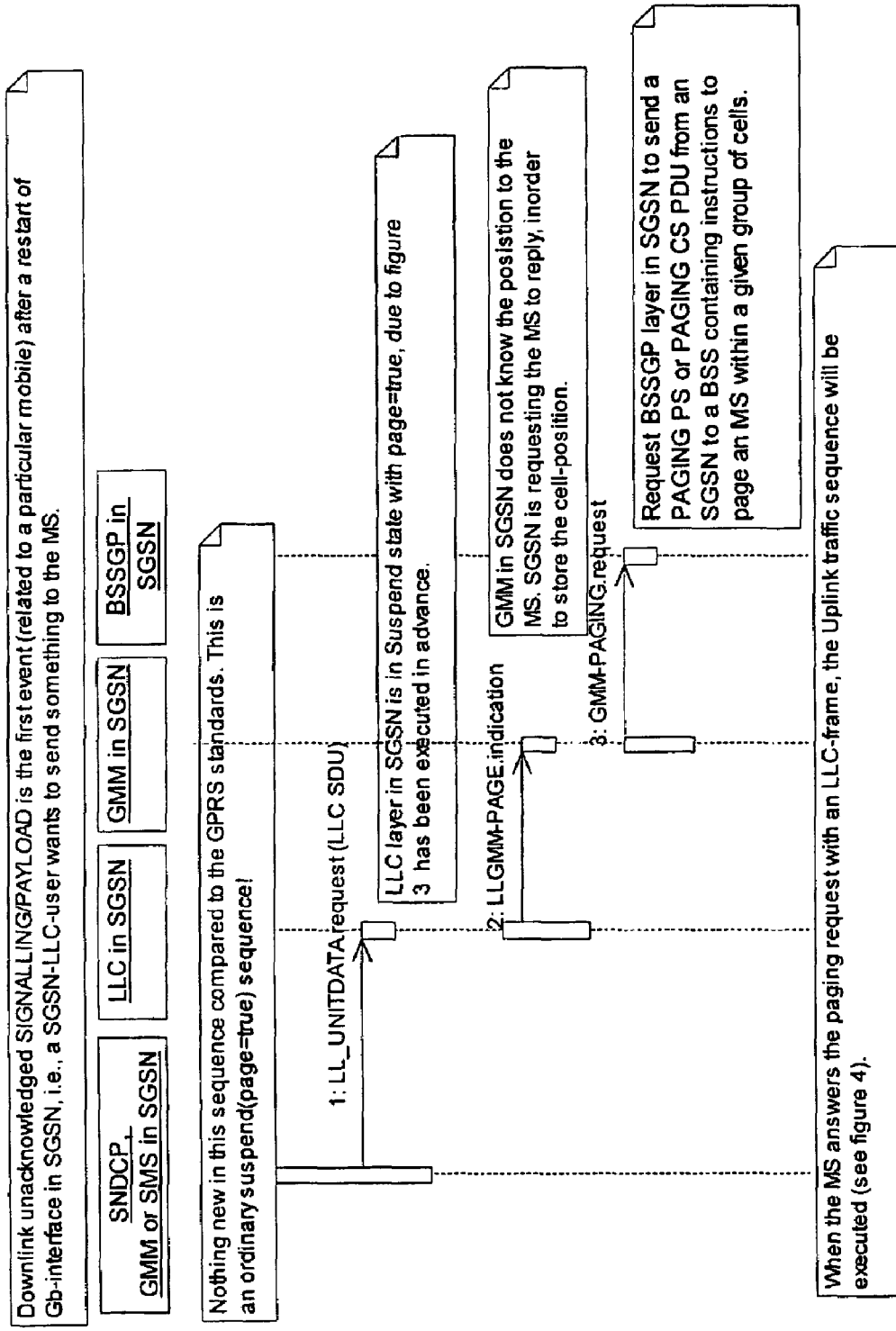
FIG. 5 is a sequence diagram showing the steps involved in Sequence: Downlink unacknowledged traffic after restart of Gb-interface.

FIG. 5: Downlink Unacknowledged Traffic After Restart of GB-Interface

FIG. 3 has been executed, i.e., GMM, LLC and SNDCP layers are ready to handle traffic for a particular MS. In FIG. 5, the first event after a Gb-restart is traffic bound to the MS, i.e., one of the LLC-users has something to send towards the MS. Each step in FIG. 5 is explained in the following list.
1) One of the LLC-users in SGSN (GMM, SMS or SNDCP) has something to send to the MS, i.e., LLC-layer in SGSN receives service primitive LL-UNITDATA.request.
2) Since the LLC-layer in SGSN is in suspend state with page-flag set to true, the service primitive LLGMM-PAGE.indication is sent to GMM in SGSN (position of the MS is not known).
3) GMM in SGSN request BSSGP layer to page the MS (GMM-PAGING.request). The BSS will page the MS at the radio network. When the MS is paged, it must send an LLC-frame as an answer. This LLC-frame will be detected in FIG. 4.

Figure 6:
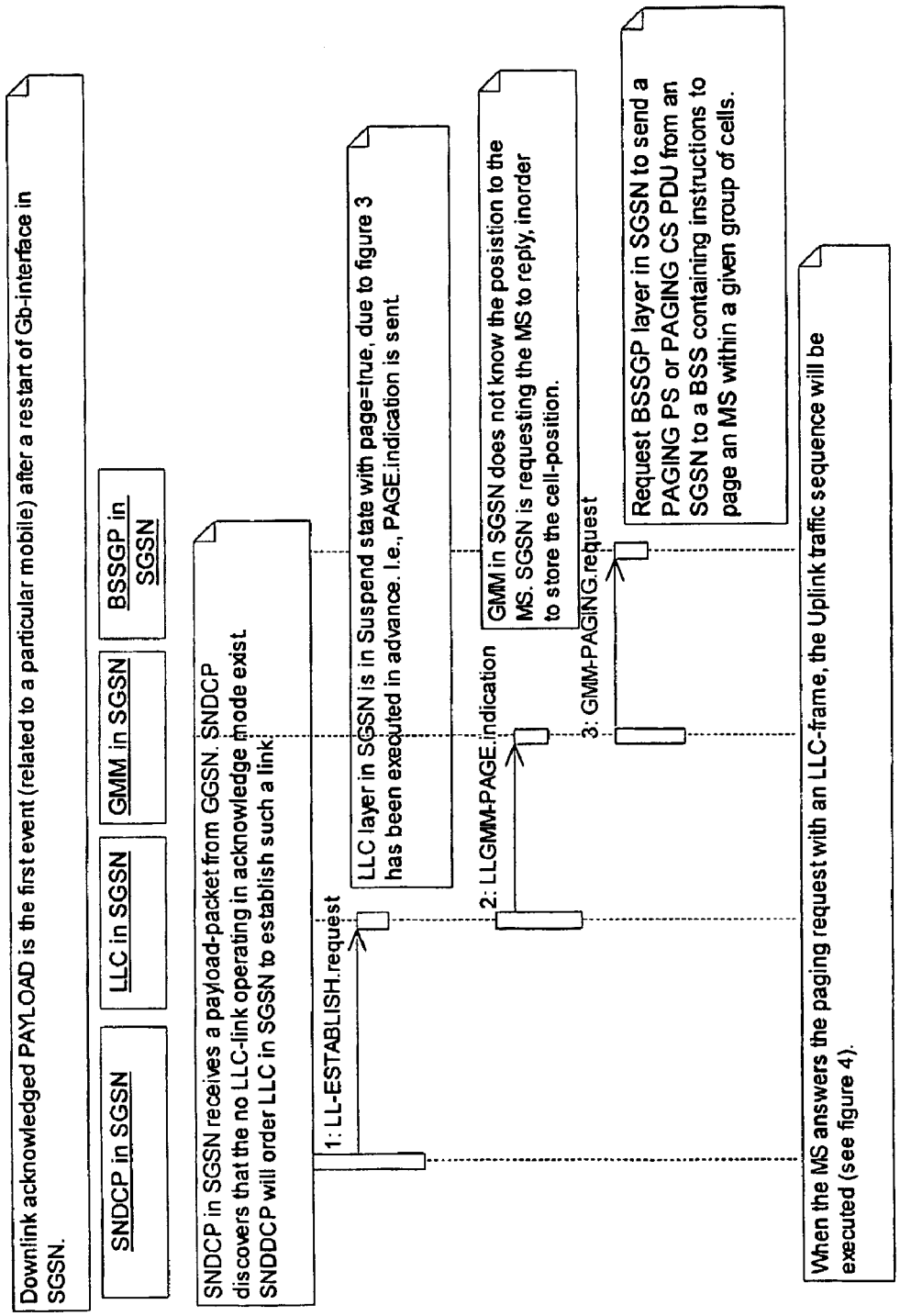
FIG. 6 is a sequence diagram of the steps of Sequence: Downlink acknowledged traffic after restart of Gb-interface.

FIG. 6: Downlink Acknowledged Traffic After Restart of GB-Interface

FIG. 3 has been executed, i.e., GMM, LLC and SNDCP layers are ready to handle traffic for a particular MS. In FIG. 6, the first event after a Gb-restart is acknowledged traffic bound to the MS, i.e., SNDCP in SGSN has received a downlink packet that shall be sent towards the MS in acknowledged mode. Each step in FIG. 5 is explained in the following list.
1) SNDCP must re-establish the LLC link in acknowledged mode, i.e., LL-ESTABLISH.request is sent to its local LLC-layer.
2) Since the LLC-layer in SGSN is in suspend state with page-flag set to true, the service primitive LLGMM-PAGE.indication is sent to GMM in SGSN (position of the MS is not known).
3) GMM in SGSN request BSSGP layer in SGSN to page the MS (GMM-PAGING.request). The BSS will page the MS at the radio network. When the MS is paged, it must send an LLC-frame as an answer. This LLC-frame will be detected in FIG. 4. (The attempt to re-establish the LLC-link in acknowledged mode will be terminated by FIG. 4, and the MS will eventually take the initiative to re-active the PDP-context)

This invention is not tied to a specific ETSI release of the standards. The references are made to Release 97 of the GPRS standards, but this invention is also applicable to later releases where LLC and SNDCP layers exist at the Gb-interface.

Another field of application of the invention is when a MS is moving around within the SGSN coverage, and it is desired to move the context closer to the used Gb-link LLC and SNDCP are performing CPU consuming activities like ciphering, compression and SNDCP-segmentation. When a MS is moving around within the SGSN coverage, the MS might change physical Gb-link between BSS and SGSN. In order to prevent too much internal transfer within the SGSN, it might be desirable to change the CPU handling of the LLC and SNDCP layers for a specific MS closer to the current used Gb-link.

The invention is also applicable when an MS requires better Quality of Service

Quality of Service (QoS) is negotiated when a PDP-context is activated. When the MS performs GPRS attach, the required QoS in the sub-sequent PDP-context activation is not known. With this invention it is possible to move the MS internally to more suitable HW if required during PDP-context activation.

The invention is also applicable for generations of Mobile systems after GPRS

Figure 1:
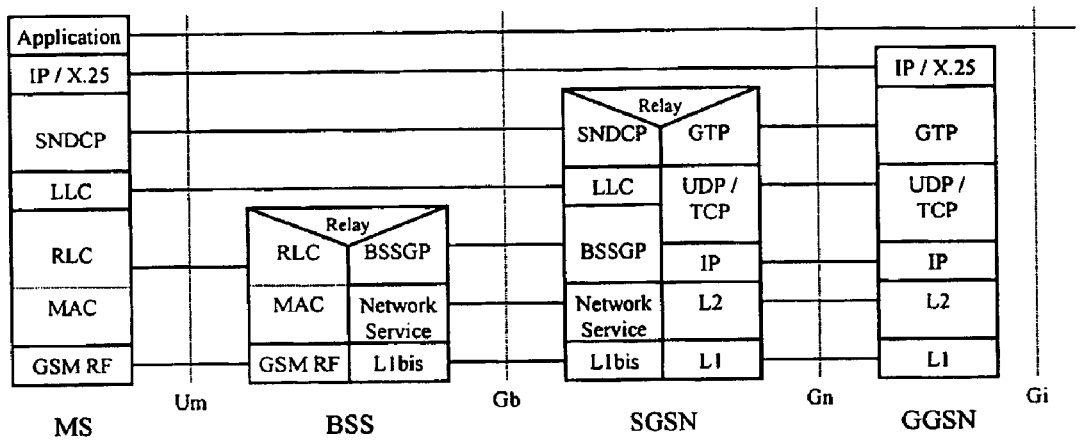
FIGS. 1 and 2 show the LLC and SNDCP protocols in their correct environment within the GPRS.
Figure 2:
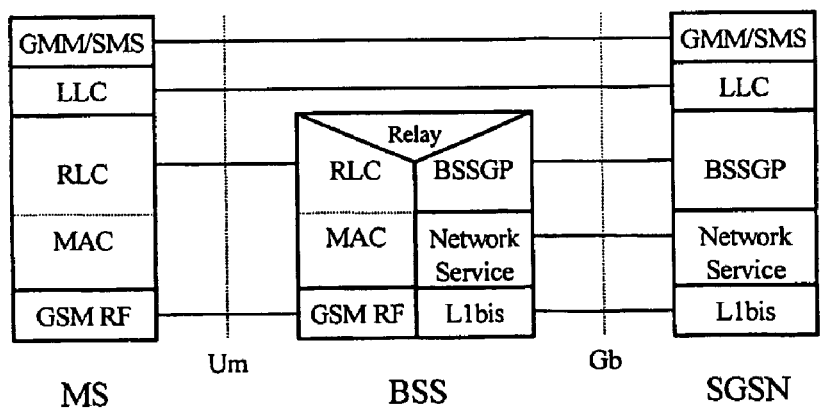

GPRS is a $2.5^{th}$ generation of Mobile standards. This patent invention is also relevant for generations of Mobile systems after GPRS where the MS will not detect that equipment is restarted somewhere between base station and Packet Data Network (Gi interface in FIG. 1). The restarted equipment (which is serving the MS) has one or several of these characteristics:

Logical link control with sequence numbers per logical link. These sequence numbers are updated after each sent or received link frame.

One of the input to the Ciphering Algorithm is dependent of previous number of sent/received frames/packets on the logical link.

Segmentation of network protocol data unit (N-PDU) into logical link control protocol data units (LL-PDU), and re-assembly of LL-PDU into a N-PDU.

Compression/decompression of user data.

Compression/decompression of protocol control information.

Abbreviation and Terminology

| Abbreviation/Terminology | Description |
| --- | --- |
| Ack | Acknowledged mode, same as Asynchronous Balanced Mode (ABM) in LLC |
| BSS | Base Station System |
| BSSGP | BSS GPRS Protocol |
| Cell-Id | Identifies uniquely a radio cell within a BSS |
| CPU | Central Processing Unit |
| CRC | Cyclic Redundancy Check, same as Frame Check Sequence (FCS). |
| DL | Downlink (direction: MS <-SGSN<-GGSN) |
| Gb | Interface between BSS and SGSN |
| GMM | GPRS Mobility Management & Session Management |
| GGSN | Gateway GPRS Switching Node |
| Gi | Interface between GGSN and IP-network |
| Gn | Interface between SGSN and GGSN |
| GPRS | General Packet Radio Service |
| GTP | GPRS Tunnelling Protocol |
| IOV-UI | Input Output Vector - unacknowledged mode |
| IP | Internet Protocol |
| Kc | Ciphering Key |
| LLC | Logical Link Control |
| LLGMM | Interface offered by LLC to the GMM (LLC user) |
| L1 | Layer One (in OSI model) |
| L1bis | Frame Relay in the GPRS Release 97. |
| L2 | Layer Two (in OSI model) |
| MAC | Medium Access Control |
| MS | Mobile Station |
| Page/Paging | The procedure to locate the position of the MS. |
| PDP | Packet Data Protocol, e.g., IPv4 |
| PDU | Protocol Data Unit |
| RLC | Radio Link Control |
| SAPI | Service Access Point Identifier |
| Service primitive | "signals" which are passed vertically between two protocol layers |
| SDU | Service Data Unit |
| SGSN | Serving GPRS Switching Node |
| SGSN upper layers | This includes; GMM, SMS, LLC and SNDCP |
| SNDCP | Subnetwork Dependent Convergence Protocol |
| SM | Session Management |
| SMS | Short Message Service |
| TCP | Transmission Control Protocol |
| TE | Terminal, connected to the Mobile Station |
| TLLI | Temporary logical link Identity |
| UDP | User Datagram Protocol |
| UL | Uplink (direction: BSS ->SGSN) |
| Um | Air Interface between MS and BSS |
| Unack | Unacknowledged mode, same as Asynchronous Disconnected Mode (ADM) in LLC |
| XID | eXchange Identification, mechanisms in LLC and SNDCP layer |

-continued

Abbreviation and Terminology

| Abbreviation/Terminology | Description |
| --- | --- |
| | to negotiate protocol parameters between peers. |

The invention claimed is:

1. A method for re-establishing a connection between a Mobile Station and a Serving General Packet Radio Service (GPRS) Support Node after a partial restart of the Serving GPRS Support Node in which only a Gb interface between the Serving GPRS Support Node and a Base Station System is restarted, comprising the steps of:
   responding to a failure of a central processing unit in the GPRS Support Node:
   informing a GPRS Mobility Management & Session Management layer in the Serving GPRS Support Node about the restart of the local Gb interface;
   identifying affected Mobile Station contexts;
   setting the GPRS Mobility Management & Session Management, Logical Link Control and Subnetwork Dependent Convergence Protocol layers in the Serving GPRS Support Node in a special Gb restart state;
   sending a Logical Link Control frame to the Serving GPRS Support Node; and
   re-establishing the appropriate Logical Link Control and Subnetwork Dependent Convergence Protocol layers on reception of the Logical Link Control frame.

2. A method in a Serving GPRS Support Node for transferring handling of Logical Link Control and Subnetwork Dependent Convergence Protocol layers for a connected Mobile Station to a Central Processing Unit close to a currently used Gb-link, involving a relocation of a local Gb-interface,
   informing a GPRS Mobility Management & Session Management layer in the Serving GPRS Support Node about a restart of the local Gb-interface, wherein the restart of the local GB-interface is in response to a failure of a central processing unit in the GPRS Support Node,
   identifying affected Mobile Station contexts are identified,
   setting the GPRS Mobility Management & Session Management, Logical Link Control and Subnetwork Dependent Convergence Protocol layers in the Serving GPRS Support Node in a special Gb restart state and on reception of a Logical Link Control frame, re-establishing the appropriate Logical Link Control and Subnetwork Dependent Convergence Protocol layers.

3. A method in a Serving GPRS Support Node for transferring handling of a connected Mobile Station internally in said Serving GPRS Support Node to hardware suited to a required Quality of Service, involving a relocation of a local Gb interface, comprising the steps of:
   informing a GPRS Mobility Management & Session Management layer in the Serving GPRS Support Node about a restart of the local Gb interface, wherein the restart of the local GB-interface is in response to a failure of a central processing unit in the GPRS Support Node,
   identifying affected Mobile Station contexts;
   setting the GPRS Mobility Management & Session Management, Logical Link Control and Subnetwork Dependent Convergence Protocol layers in the Serving GPRS Support Node in a special Gb restart state, re-establishing on reception of a Logical Link Control frame the appropriate Logical Link Control and Subnetwork Dependent Convergence Protocol layers.

4. The method in claim 3, further comprising the step of the Serving GPRS Support Node ordering the Mobile Station to send a Logical Link Control frame to the Serving GPRS Support Node.

5. The method in claim 3 wherein said step of setting the GPRS Mobility Management & Session Management layer is set in a special Gb restart state further includes the GPRS Mobility Management & Session Management starting a Mobile Reachable Timer in the Serving GPRS Support Node according to an agreed value with the Mobile Station, and setting the GPRS Mobility Management & Session Management state to standby-reachable.

6. The method in claim 5, wherein said step in which the Logical Link Control layer is set in said special Gb restart state involves the GPRS Mobility Management & Session Management re-entering information regarding the affected Mobile Station into the Logical Link Control layer.

7. The method in claim 6, further comprising the step of the GPRS Mobility Management & Session Management supplying the Logical Link Control layer with ciphering keys and ciphering algorithms.

8. The method in claim 6, further comprising the step of the GPRS Mobility Management & Session Management setting the Logical Link Control layer into a first suspend state in order to inform GPRS Mobility Management & Session Management when traffic shall be sent to the Mobile Station.

9. The method in claim 8, further comprising the step of setting the Subnetwork Dependent Convergence Protocol layer in said special Gb restart state by GPRS Mobility Management & Session Management re-entering any established Packet Data Protocol context to the Subnetwork Dependent Convergence Protocol layer, when downlink payload arrives at the Gn interface in the Serving GPRS Support Node and the Mobile Station must be paged.

10. The method in claim 9, further comprising the steps of:

re-establishing the layers by the Mobile Station sending a Logical Link Control frame to the Serving GPRS Support Node;

setting the Logical Link Control layer in the Serving GPRS Support Node into a second suspend state, where the Logical Link Control layer is not allowed to inform the GPRS Mobility Management & Session Management when traffic shall be sent to the Mobile Station; and GPRS Mobility Management & Session Management in Serving GPRS Support Node ordering the Logical Link Control layer to inform the Mobile Station about the need of re-initialisation of its Logical Link Control and Subnetwork Dependent Convergence Protocol layers.

11. The method in claim 10, further comprising the step of informing the Mobile Station about the need of re-initialisation by the Logical Link Control layer sending a Logical Link Control-exchange Identification message with a reset parameter to the Mobile Station.

12. The method in claim 10, further comprising the steps of deactivating the GPRS Mobility Management & Session Management in the Serving GPRS Support Node any Packet Data Protocol context in acknowledged mode, and ordering the Mobile Station to reactivate the Packet Data Protocol context in question.

13. The method in claim 9, further comprising the step of re-establishing the layers in the Serving GPRS Support Node by sending unacknowledged traffic to the Mobile Station, whereupon the Mobile Station will send a Logical Link Control frame as an answer.

14. The method in claim 9, further comprising the step of sending acknowledged traffic to the Mobile Station whereupon the Mobile Station responds by sending a Logical Link Control frame to the Serving GPRS Support Node to re-establish said Logical Link Control and Subnetwork Dependent Convergence Protocol layers in the Serving GPRS Support Node.

15. A GPRS Support Node adapted to operate as a Serving GPRS Support Node, comprising:

means for re-establishing a connection between a Mobile Station and the Serving GPRS Support Node after a partial restart of the Serving GPRS Support Node, in which only a Gb-interface between the Serving GPRS Support Node and the Base Station System is restarted, wherein the restart of the GB-interface is in response to a failure of a central processing unit in the GPRS Support Node, wherein said means for reestablishing includes means for informing a GPRS Mobility Management & Session Management layer in the Serving GPRS Support Node about the restart of the local Gb interface;

means to identify affected Mobile Station context, and means to set Logical Link Control and Subnetwork Dependent Convergence Protocol layers in the Serving GPRS Support Node in a special Gb restart state, whereupon the Logical Link Control and Subnetwork Dependent Convergence Protocol layers are re-established on reception of a Logical Link Control frame.

16. A GPRS Support Node adapted to operate as a Serving GPRS Support Node comprising:

means for transferring handling of Logical Link Control and Subnetwork Dependent Convergence Protocol layers for a connected Mobile Station to a Central Processing Unit close to a currently used Gb link, involving a relocation of a local Gb interface, wherein said means for transferring includes means for informing a GPRS Mobility Management & Session Management layer in a Serving GPRS Support Node about the restart of the local Gb interface, wherein the restart of the local GB-interface is in response to a failure of a central processing unit in the GPRS Support Node.

means to identify affected Mobile Station context; and means to set Logical Link Control and Subnetwork Dependent Convergence Protocol layers in the Serving GPRS Support Node in a special Gb restart state, whereupon the Logical Link Control and Subnetwork Dependent Convergence Protocol layers are re-established on reception of a Logical Link Control frame.

17. A GPRS Support Node adapted to operate as a Serving GPRS support Node comprising:

means for transferring handling of a connected Mobile Station internally in said Serving GPRS Support Node to hardware suited to a required Quality of Service. involving a relocation of a local Gb interface, wherein said means for transferring includes means for informing a GPRS Mobility Management & Session Management layer in the Serving GPRS Support Node about a restart of the local Gb interface, wherein the restart of the local GB-interface is in response to a failure of a central processing unit in the GPRS Support Node, means to identify affected Mobile Station context; and means to set Logical Link Control and Subnetwork Dependent Convergence Protocol layers in the Serving GPRS Support Node in a special Gb restart state, whereupon the Logical Link Control and Subnetwork Dependent Convergence Protocol layers are re-established on reception of a Logical Link Control frame.

18. The GPRS Support Node in claim 17, further comprising means for ordering the Mobile Station to send a Logical Link Control frame to the Serving GPRS Support Node.

\* \* \* \* \*